(12) United States Patent
Weinholz et al.

(10) Patent No.: US 6,795,214 B2
(45) Date of Patent: Sep. 21, 2004

(54) METHOD FOR GENERATING TRAPPING CONTOURS IN A PRINT PAGE

(75) Inventors: Peter Weinholz, Kiel (DE); Volkmar Funke, Altenholz (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 434 days.

(21) Appl. No.: 09/956,156

(22) Filed: Sep. 19, 2001

(65) Prior Publication Data

US 2002/0051156 A1 May 2, 2002

Related U.S. Application Data

(63) Continuation of application No. PCT/DE00/00714, filed on Mar. 7, 2000.

(30) Foreign Application Priority Data

Mar. 19, 1999 (DE) .......................................... 199 12 511

(51) Int. Cl.[7] .............................. H04N 1/50; H04N 1/58; G06T 5/00; G06T 7/00
(52) U.S. Cl. ..................... 358/1.9; 358/3.26; 358/518; 358/540; 382/167; 382/205; 382/199; 382/275
(58) Field of Search ............................. 358/1.9, 3.26, 358/518, 530, 540, 501, 528, 515; 382/162, 167, 205, 199, 275, 254

(56) References Cited

U.S. PATENT DOCUMENTS

| 4,583,116 | A | * | 4/1986 | Hennig et al. .............. 358/515 |
|---|---|---|---|---|
| 4,626,902 | A | | 12/1986 | Yamada |
| 4,725,966 | A | | 2/1988 | Darby et al. |
| 4,931,861 | A | | 6/1990 | Taniguchi |
| 5,113,249 | A | | 5/1992 | Yosefi |
| 5,295,236 | A | * | 3/1994 | Bjorge et al. .............. 715/527 |
| 5,386,483 | A | | 1/1995 | Shibazaki |
| 5,542,052 | A | * | 7/1996 | Deutsch et al. ............. 345/589 |
| 5,613,046 | A | * | 3/1997 | Dermer ....................... 358/1.9 |
| 5,668,931 | A | | 9/1997 | Dermer |
| 5,686,998 | A | | 11/1997 | Clark et al. |
| 6,141,462 | A | * | 10/2000 | Yoshino et al. ............. 382/284 |
| 6,341,020 | B1 | * | 1/2002 | Rumph et al. ............... 358/1.9 |
| 6,345,117 | B2 | * | 2/2002 | Klassen ....................... 382/167 |
| 6,377,711 | B1 | * | 4/2002 | Morgana ..................... 358/1.9 |
| 6,549,303 | B1 | * | 4/2003 | Trask .......................... 358/1.9 |
| 6,654,145 | B1 | * | 11/2003 | Speck ......................... 358/1.9 |
| 2003/0063301 | A1 | * | 4/2003 | Klassen ....................... 358/1.9 |
| 2003/0090689 | A1 | * | 5/2003 | Klassen ....................... 358/1.9 |

FOREIGN PATENT DOCUMENTS

| DE | 24 46 761 | 5/1975 |
|---|---|---|
| EP | 0 096 084 B1 | 10/1985 |
| EP | 0 373 704 B1 | 6/1990 |
| EP | 0 445 066 A2 | 9/1991 |
| EP | 0 484 890 A2 | 5/1992 |
| EP | 0 539 953 A2 | 5/1993 |
| EP | 0 618 718 A1 | 10/1994 |
| EP | 0 929 189 A2 | 7/1999 |

* cited by examiner

*Primary Examiner*—Scott Rogers
(74) *Attorney, Agent, or Firm*—Laurence A. Greenberg; Werner H. Stemer; Ralph E. Locher

(57) ABSTRACT

The method generates trapping contours on color edges in a page to be printed that is defined in digital data. The trapping contours reduce the defects that are caused by register errors in the printing machine. The method operates similarly to a filter, using a window that is moved over the entire page, picture element by picture element. Certain neighboring picture elements of the central element are selected and used for calculating a trapping color. The color separation proportions of the central picture element are compared with the corresponding color separation proportions of the trapping color. The result of the comparison determines which color separation proportions of the central picture element are to be changed.

8 Claims, 5 Drawing Sheets

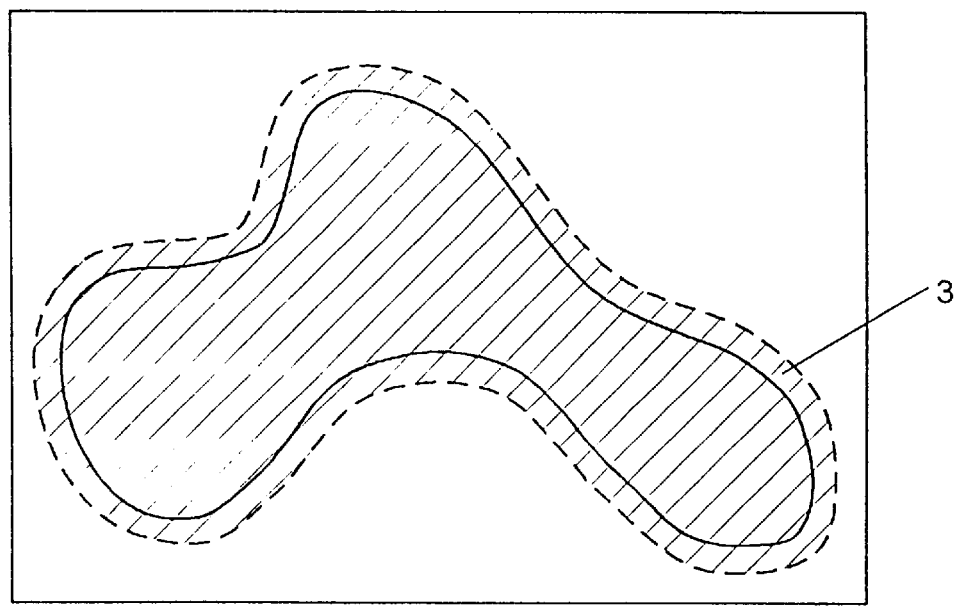
Fig. 5-PRIOR ART
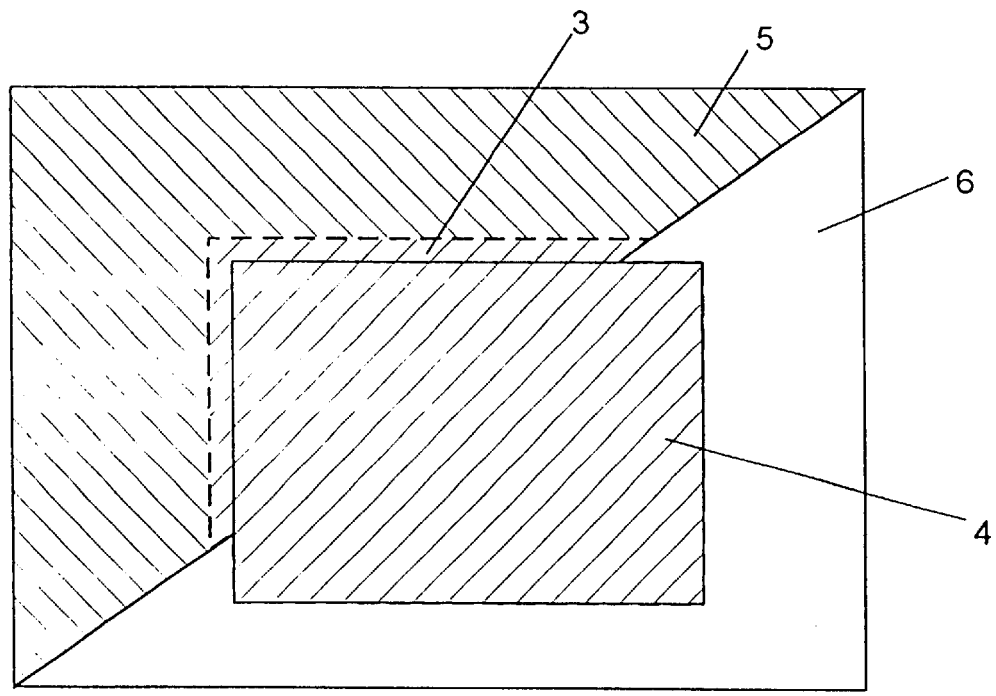
Fig. 6-PRIOR ART

| 75 | 75 | 50 | 50 | 50 |
|----|----|----|----|----|
| 75 | 75 | 50 | 50 | 50 |
| 75 | 75 | 0  | 0  | 0  |
| 75 | 75 | 0  | 0  | 0  |
| 75 | 75 | 0  | 0  | 0  |

| 0 | 0 | 0   | 0   | 0   |
|---|---|-----|-----|-----|
| 0 | 0 | 0   | 0   | 0   |
| 0 | 0 | 100 | 100 | 100 |
| 0 | 0 | 100 | 100 | 100 |
| 0 | 0 | 100 | 100 | 100 |

Cyan          Magenta

CZ = 0          DZ = 400
MZ = 100   ⟹   SZ = Magenta

|   | CN | MN  | DN  | SN | Pixel selected |
|---|----|-----|-----|----|----------------|
| a | 75 | 0   | 225 | C  | x              |
| b | 50 | 0   | 150 | C  | x              |
| c | 50 | 0   | 150 | C  | x              |
| d | 75 | 0   | 225 | C  | x              |
| e | 0  | 100 | 400 | M  |                |
| f | 75 | 0   | 225 | C  | x              |
| g | 0  | 100 | 400 | M  |                |
| h | 0  | 100 | 400 | M  |                |

⟹ CT = 65
    MT = 0

CZ_new = 65 × R
MZ_new = 100

METHOD FOR GENERATING TRAPPING CONTOURS IN A PRINT PAGE

CROSS-REFERENCE TO RELATED APPLICATION

This application is a continuation of copending International Application PCT/DE/00/00714, filed Mar. 7, 2000, which designated the United States.

BACKGROUND OF THE INVENTION

Field of the Invention

The invention lies in the field of digital image processing in reproduction technology and pertains, more specifically, to a method of generating trapping contours at color edges in a print page. Such trapping contours serve for reducing the disturbances generated by misregistrations in the printing press, i.e. errors that arise when the colors are not printed on top of one another perfectly congruently but rather slightly shifted.

The artwork masters which are created for print pages in reproduction technology contain all the elements that are to be printed, including text, graphic objects, and images. In the case of electronically produced masters, these elements take the form of digital data. The data for an image are generated in that the image is scanned in a scanner by pixels and rows, each pixel is broken down into color components, and the color values of these components are digitized. The data for texts and graphic objects are generally generated directly in a computer by text processing and drawing programs. Depending on the output process that is to follow (i.e. output on a color printer or printing in a conventional printing press), the data for the page elements are generated in the color components red, green and blue (RGB) or in the colors of four-color printing, i.e. cyan, magenta, yellow and black (CMYK). The colors are printed on top of one another on the print medium (e.g. paper) in the color printer or the printing press.

Next, the digitized text, graphic objects, and images undergo diverse processing (e.g. color correction or modification in arrangement and shape, and final assembly into a print page) in a processing station in accordance with the specifications of a layout, while being visually monitored on a color monitor. The print page data are then converted into a data format which is suitable for output, for instance in the page description language PostScript, and stored. In this process, separate print page items of data, known as color separation data, are generated for each of the colors CMYK. The color separation data are recorded in high resolution on film material or directly on printing plates using a film or plate recorder. There also exist digital printing presses which work without plates. With these, the color separation data are transferred directly to the digital printing press and printed on the print medium there.

One problem that arises in printing technology is misregistration in the printing press, i.e. errors which occur when the colors are not overlaid perfectly congruently, but rather shifted relative to one another, in the printing units through which the paper continuously runs. These errors will now be demonstrated in a simple example wherein a red circle is printed on a black background. With reference to FIG. 1, subfigures 1a and 1b represent the color separations Y and M, the superimposition of which produces the red circle, and FIG. 1c represents the color separation K of the black background from which the area of the circle is missing. FIG. 2 represents the print result when the color separations Y, M and K are precisely superimposed in the printing press. The color separations Y and M completely fill the missing circle area in the color separation K. FIG. 3 represents the print result given misregistration. In this example, the color separation K has been shifted up and to the right relative to separations Y and M, so that the separations Y and M no longer completely fill the missing circle in separation K, and an unprinted stripe 1 emerges. Since the unprinted stripe 1 is the color of the paper, which is typically white, it contrasts sharply with the red and black colors and is perceived as obtrusive. The shifting of the color separations also produces a stripe 2 wherein all three separations Y, M and K are superimposed on one another. Since, in this case, the brighter colors Y and M are printed on the dark color K, this stripe 2 does not disturb the print result. For purposes of illustration, FIG. 3 represents a very large shift of the color separations. But the unprinted stripes that emerge given smaller shifts, such as occur in practice in printing operations, are also very obtrusive, and countermeasures must be taken to eliminate or reduce these errors.

One possibility for eliminating or reducing the above described disturbing effects caused by misregistration is to control the printing plate register or the paper feed in the printing press more precisely. But this is expensive and requires a large outlay, and it is not always possible to retrofit older printing presses with better control devices.

A second possibility consists in what is known as trapping in the preparing of the color separation data in the reproduction technique. Trapping is effected during the preparation of the color separation data. A trapping frame is generated in some color separations but not in others. The trapping of the correct color separations ensures that a sufficiently large overlap of the graphic objects in the color separations will still exist even given misregistrations in the printing press, and consequently obtrusive unprinted stripes cannot emerge. For which color separations a trapping frame must be created and for which not depends on the colors in the graphic objects relative to the colors in their immediate environment. As a general rule, the brighter colors are trapped vis-a-vis the darker colors. The outlines of the darker colors, which determine contour, are not changed, and the shapes of the graphic objects are thus subjectively maintained despite the overlapping of the color separations when they are printed on top of each other.

With reference to FIG. 4, there is shown a trapping frame 3 for the color separation Y from the example of FIG. 1; i.e., the circle is enlarged by the width w. When the circle in the separations Y and M is enlarged, but not the empty circular area in the separation K, then obtrusive stripes cannot emerge even when the color separations are shifted. The width w of the trapping frame 3 must be selected large enough to cover the maximum expected shift; i.e., the width is dependent upon the quality and age of the printing press that is used.

According to the prior art, the trapping frames are created by first analyzing which graphic objects are contained in a print page and where they adjoin one another. Depending on the type of objects and the colors on either side of a color boundary, it is then determined which of the objects will acquire a trapping frame and which color the trapping frame will take. The term graphic object refers to an area of arbitrary shape which is filled with color values in an arbitrary fashion. In the simplest case, the area is evenly filled with a constant color. But it can also contain a vignette, i.e. a continuous variation of the colors in a particular color gamut. But a graphic object can also contain scanned image data or a pattern of different color values. The type of color fill determines the type of graphic object, e.g. "uniformly colored area", "vignette", or "image". The patent U.S. Pat. No. 5,113,249 teaches this kind of method for creating trapping frames according to the prior art. There, the type of graphic object is designated the "area type", and depending on the "area types" on either side of a color boundary, it is decided whether or not to create a trapping frame, which of the two area types to widen with it, and which color the trapping frame should take.

In the methods according to the prior art, the types of graphic objects on the print page and the boundaries of the objects must be determined. If the print page is defined in an object-oriented page description language such as PostScript, this can by accomplished by analyzing the page description. That type of method is described in the patent U.S. Pat. No. 5,295,236. If the print page is not given in an object-oriented description but rather as a matrix of pixels, then the graphic objects and their boundaries must be determined using a pattern recognition technique. These techniques involve large computing expenditures.

Additional computing power is consumed in the methods according to the prior art by the computation of the trapping frame itself. Once the decision is made as to which object is to be trapped, a frame of a specific width must be computed for the outline of the object, whereby the outline of a graphic object is generally a series of curves and straight lines. If the object has a complex shape as represented in FIG. 5, the computation of the trapping frame requires a large computing expenditure. The computing expenditure is further increased if only part of the boundary of the graphic object, and not the entire boundary, must be provided with a trapping frame. FIG. 6 represents an example wherein the graphic object 4 is surrounded by the color area 5 on part of its boundary and by the color area 6 on the rest of its boundary. Thus, a trapping frame 3 will be computed only for the part of the boundary that adjoins the color surface 5.

U.S. Pat. No. 5,386,483 (European patent EP 0 539 953) describes a method wherein a trapping frame is created with the aid of a window operator which is moved over a page row-by-row. A presumption upon which this method is based is that the page only contain areas which are uniformly filled with different colors (black copy image) and whose pixels are referenced by color numbers (region numbers). It is recorded in a color table which colors are assigned to which color numbers. The window operator determines whether the pixels within the window which are provided with different priorities have different color numbers. If so, provided that specific priority rules are satisfied, a new color number is assigned to the pixel in the center of the window. When the window operator has crossed the page a number of times, new frame-shaped color regions having new color numbers emerge at the boundaries of the original color regions. Lastly, the color table is expanded by the assigning of colors to the new color numbers. This method can only be applied when the page exclusively contains graphic objects which are areas of constant color.

All the prior art methods include the steps of distinguishing graphic objects of specific types on the page, computing the boundaries of these objects, and generating a respective trapping frame at the boundaries. The trapping frames thus acquire a constant color which is determined on the basis of the colors and/or the type of the adjoining objects. None of the methods in the prior art determines a trapping frame in a scanned image at expressed color contours, although disturbing effects can also emerge at such color contours as a consequence of misregistrations in the printing press.

SUMMARY OF THE INVENTION

It is accordingly an object of the invention to provide a method of defining a trapping frame on a print page, which overcomes the above-mentioned disadvantages of the heretofore-known devices and methods of this general type and which generates trapping frames and puts forward an effective and simple method by which a trapping contour is created in a page, which reduces or eliminates the disturbing effects created by registration errors.

With the foregoing and other objects in view there is provided, in accordance with the invention, a method of generating trapping contours in a page provided in the form of digital image data, for ameliorating disturbing effects of misregistrations in a printing machine. The method comprises the following method steps:

moving a window over the image data of the page pixel-by-pixel, wherein the window contains a center pixel and neighbor pixels premarked for further processing;

determining respective dark values for the center pixel and for the premarked neighbor pixels from color separation proportions;

determining a darkest color separation for the center pixel and for the premarked neighbor pixels;

comparing the dark values and the darkest color separations of the center pixel and of the premarked neighbor pixels for selecting particular pixels from the premarked neighbor pixels;

calculating a trapping color from the selected particular pixels;

comparing the color separation proportions of the center pixel with the corresponding color separation proportions of the trapping color and correspondingly modifying the color separation proportion of the center pixel.

The expression "pixel" as used herein should be understood as any picture element as used in digital picture data processing.

In other words, respective dark values are determined for the central picture element and the premarked neighboring picture elements from the color separation proportions; then the darkest color separation is determined for the central picture element and the premarked neighboring picture elements;

particular picture elements are selected from the premarked neighboring picture elements by comparing the dark values and the darkest color separations of the central picture element and the premarked neighboring picture elements;

a trapping color is calculated from the selected picture elements;

a decision is made how to modify the color separation proportion of the central picture element by comparing the color separation proportions of the central picture element to the corresponding color separation proportions of the trapping color.

In accordance with an additional feature of the invention, the color separation proportions are weighted according to their subjectively perceived brightness for purposes of determining the dark values.

In accordance with another feature of the invention, the color separation proportions are weighted according to their subjectively perceived brightness for purposes of determining the darkest color separations.

In accordance with a further feature of the invention, the premarked neighbor pixels, only those pixels whose dark value is less than that of the center pixel and whose darkest color separation is not the same as that of the center pixel are selected.

In accordance with again an added feature of the invention, the color separation proportions of the trapping colors are calculated as the average values of the corresponding color separation proportions of the selected pixels.

In accordance with again another feature of the invention, a color separation proportion of the center pixel is modified only if the color separation proportion of the center pixel is less than a first threshold value, which is a function of the corresponding color separation proportion of the trapping colors, and if the first threshold value exceeds a second threshold value.

In accordance with yet another feature of the invention, if the black separation value of the center pixel exceeds a threshold value, the other color separation values of the center pixel are replaced by the corresponding color separation values of the trapping colors.

In accordance with a concomitant feature of the invention, the color separation proportions of the center pixel are modified by replacing them with corresponding color separation proportions of the trapping colors, which have been reduced by a reduction factor.

In summary, the inventive method does not presume knowledge of the graphic objects on the page or its type. It processes each color contour in the page the same way, regardless of whether this is a matter of a color boundary between graphic objects or a color contour within a scanned image.

Other features which are considered as characteristic for the invention are set forth in the appended claims.

Although the invention is illustrated and described herein as embodied in a method for generating trapping contours in a print page, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 a trapping frame for a graphic object of arbitrary shape;

FIG. 6 a trapping frame for part of the boundary of a color area;

DESCRIPTION OF THE PREFERRED EMBODIMENTS

Figure 1:
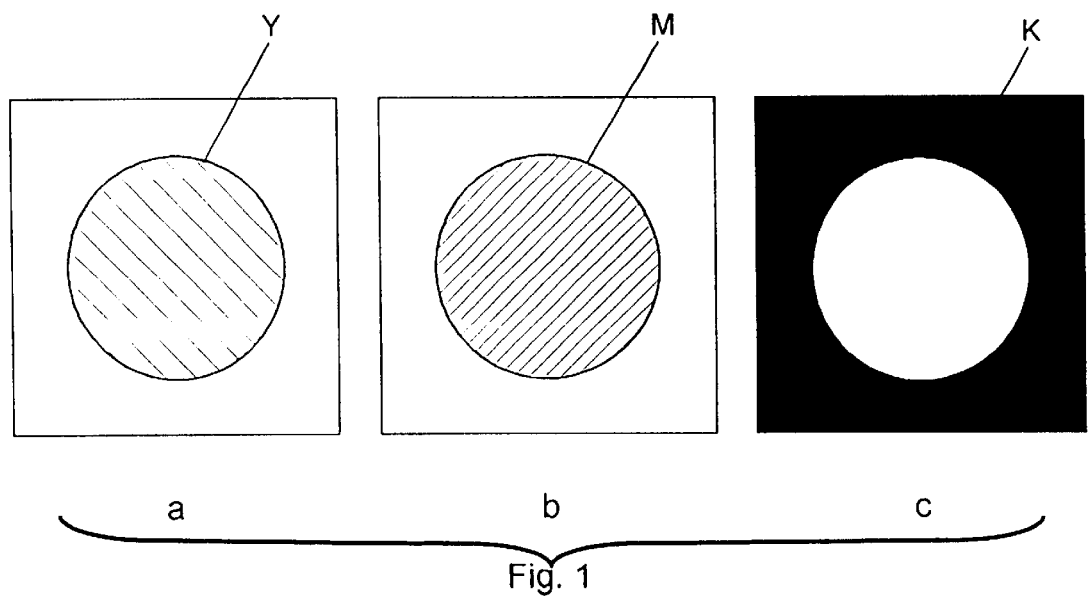
FIG. 1 is a color separations Y, M and K for an exemplary print.
Figure 2:
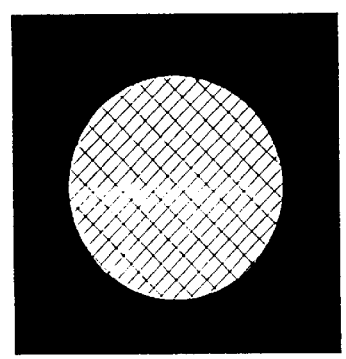
FIG. 2 the superimposing of separations Y, M, K without misregistration in the printing press.
Figure 3:
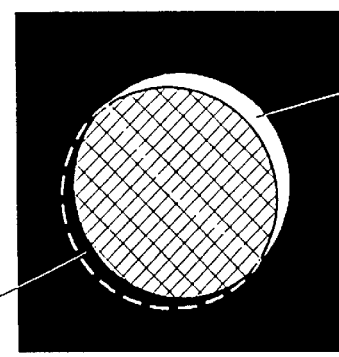
FIG. 3 the superimposing of color separations Y, M, K with misregistration in the printing press.
Figure 4:
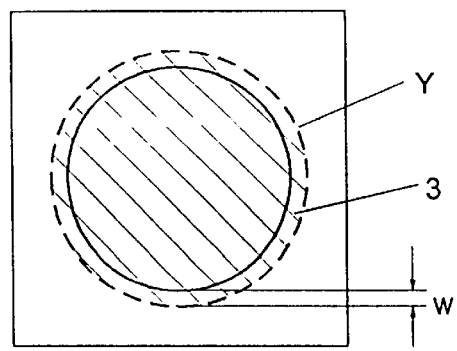
FIG. 4 a trapping frame for separation Y.
Figure 7A:
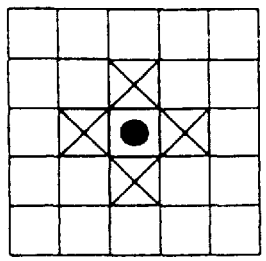
FIGS. 7A to 7E show various arrangements of premarked neighbor pixels.
Figure 7B:
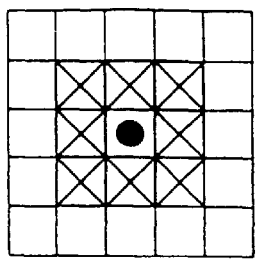
Figure 7C:
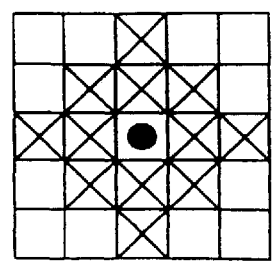
Figure 7D:
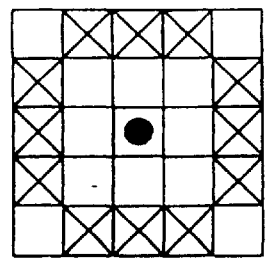
Figure 7E:
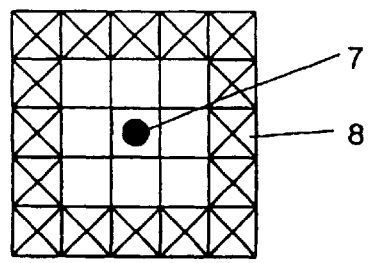

Referring now once more to the figures of the drawing in detail, the inventive process works like a filter with a window that is moved over the page line-by-line, and within each line pixel-by-pixel. Of the pixels inside the window, only particular pixels are provided for further processing. FIG. 7A to FIG. 7E represent examples of various filter windows. Each window has a center pixel 7 and specific premarked neighbor pixels 8, which can be used for further processing. The remaining pixels of the window do not contribute to creating the trapping contour. In every position of the window, a sequence of calculations is carried out in order to decide whether and how to modify the color separation values of the center pixel 7. Next, the window is advanced one pixel, and the calculations and decisions are repeated for the new window position. The arrangement of the premarked neighbor pixels 8 influences the width of the subsequently created trapping contour.

In a first step, a weighted dark value DZ is computed for the center pixel 7. The color separation proportions of the center pixel (CZ, MZ, YZ, KZ) are weighted according to their subjectively perceived brightness, since 100% yellow is perceived as brighter than 100% cyan, for example. Similarly, 100% cyan is perceived as brighter than 100% magenta, which in turn appears brighter than 100% black. Exemplary weight factors of 1 for Y, 3 for C, 4 for M, and 8 for K, are given. The dark value DZ of the center pixel 7 is therefore calculated by the following equation:

$$DZ = 3 \times CZ + 4 \times MZ + 1 \times YZ + 8 \times KZ \qquad (1)$$

Thus, the color separation values CZ=20%, MZ=40%, YZ=50%, KZ=10% yield a dark value DZ=60+160+50+80=350.

In the next step, the darkest color separation SZ of the center pixel 7 is determined, i.e. the color separation which contributes the greatest share to dark value DZ; i.e., the darkest color separation SZ is magenta.

Figure 8:
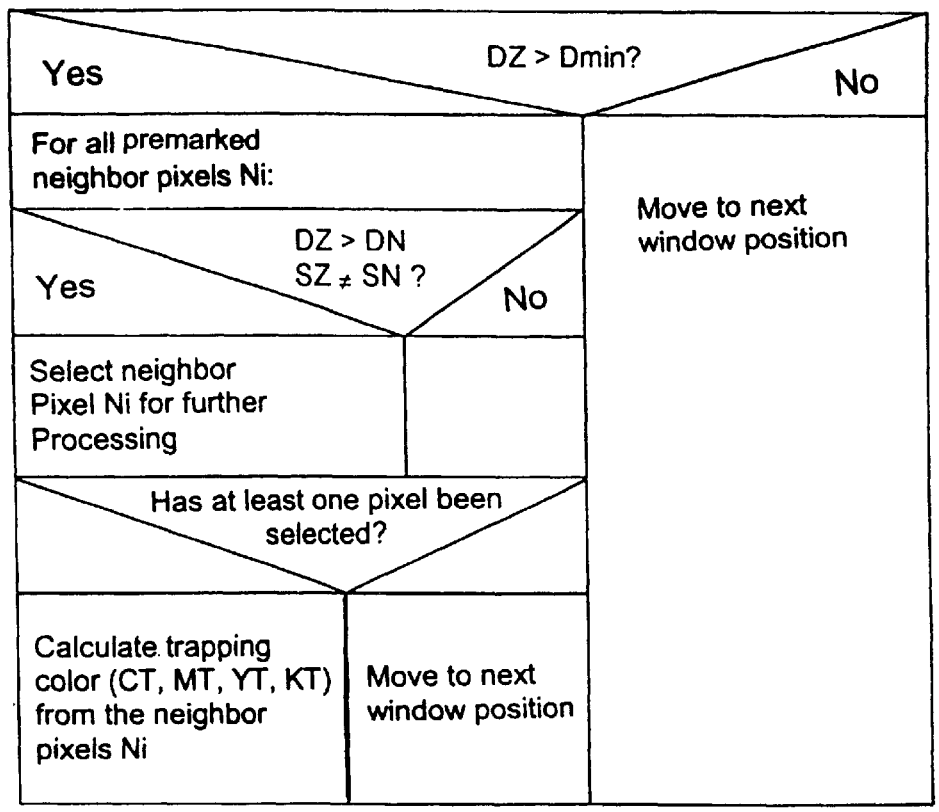
FIG. 8 flowchart for the selection of neighbor pixels.

The next steps are represented as a flowchart in FIG. 8. First, it is tested whether the dark value DZ of the center pixel 7 exceeds a threshold value Dmin. A value of 10% of the maximum possible dark value can be prescribed as the threshold value Dmin, for example. If the threshold value Dmin has not been crossed, i.e. if the center pixel is so bright that interference cannot arise at this location as a consequence of misregistrations, the window is moved to its next position without any further calculations. Otherwise, the dark value DN and the darkest color separation SN are determined in succession for all premarked neighbor pixels 8, which are referenced Ni in FIG. 8. Only if the dark value DZ of the center pixel is greater than the dark value DN of the neighbor pixel, and the darkest color separation of the center pixel is not the same as that of the neighbor pixel, is the corresponding neighboring pixel selected for further processing. Only under these conditions can a substantially visible disturbance occur given misregistration. Next, a trapping color (CT, MT, YT, KT) is calculated from the color values of the selected neighbor pixels Ni, for instance as the average value of the selected neighbor pixels. But the trapping color may also be determined according to any other formula. What is essential to the inventive method is merely that the trapping color be representative of the colors of the selected neighbor pixels Ni. If no neighbor pixels have been selected for further processing, then no trapping colors are calculated, and the window is moved to its next position.

Figure 9:
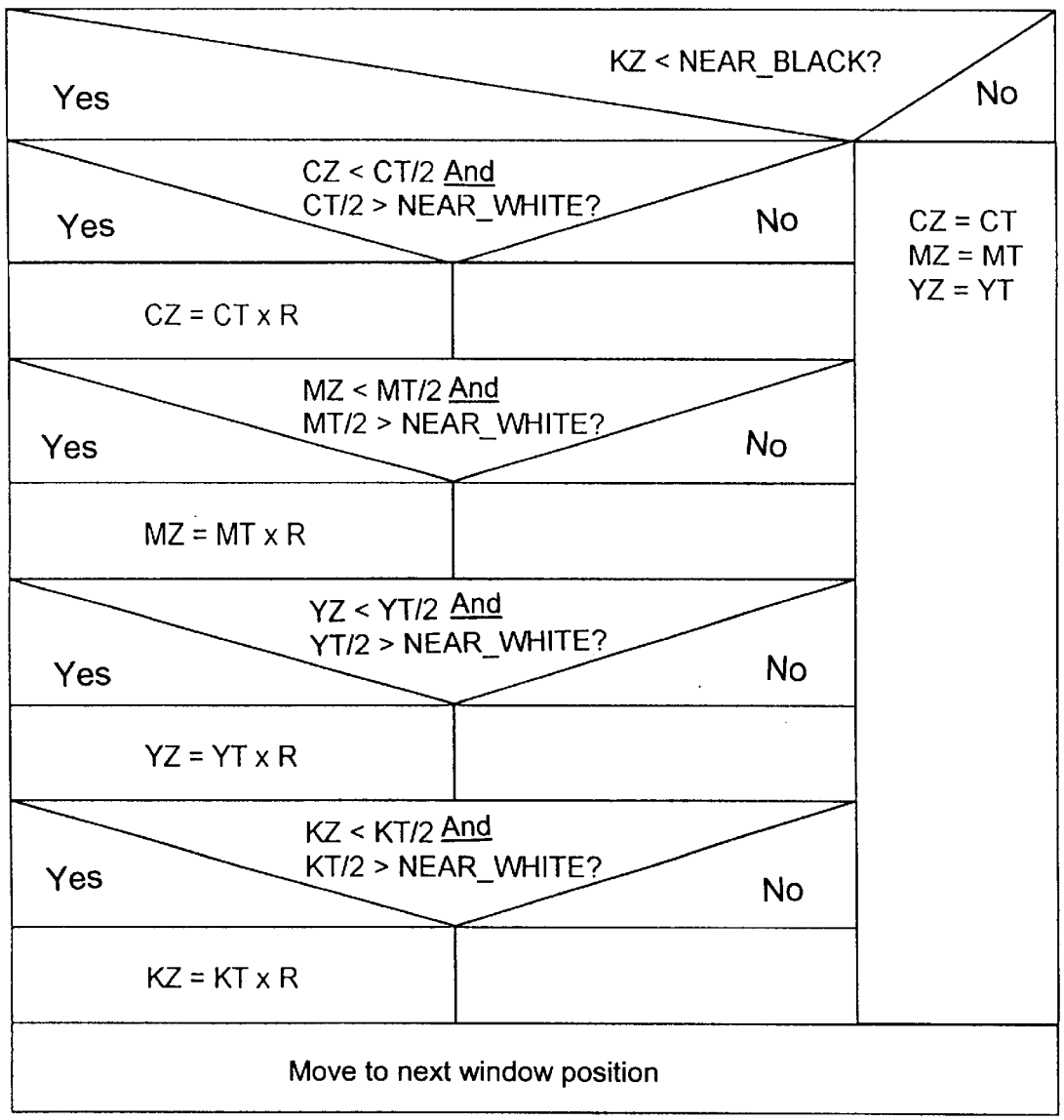
FIG. 9 flowchart for the modification of the color separation values of the center pixel.

The next steps, wherein it is decided whether and how to modify the color separation values of the center pixel 7, are represented in FIG. 9 in flowchart form. First, it is checked whether the black color separation value KZ of the center pixel is less than a threshold value NEAR BLACK, which may be fixed at 90% of the maximum possible color separation value. If KZ is not less than the threshold value, i.e. if the center pixel is almost completely black, the remaining color separation values CZ, MZ, YZ of the center pixel are replaced by the corresponding values CT, MT, YT of the trapping colors. The window is then moved to its next position.

If KZ is less than the threshold value NEAR BLACK, the color separation values of the center pixel and of the calculated trapping colors are determined in succession, and from these it is derived whether and how to modify the color separation value of the center pixel. This is described in the example of the cyan color separation. It is checked whether the value of the center pixel CZ is less than half the value CT of the trapping color and whether, at the same time, half the value CT of the trapping color is greater than a threshold value NEAR WHITE, which may be fixed at 10% of the maximum possible color separation value, for instance. It is not essential to the invention that exactly half the value CT be selected. What is intended is merely to check whether the color separation value in the center pixel is significantly less than the corresponding color separation value of the trapping color, and whether the color separation value of the trapping color is not too close to the white value. Should one of these two conditions fail, then "it is not worth it" to modify the color separation value in the center pixel, because modification would not have the desired effect, or only marginally so. But if both conditions are met, then the color separation value CZ of the center pixel is replaced by a value which derives from the multiplication of the color separation value CT of the trapping color by a reduction factor R. The reduction factor R is applied in order to make the created trapping contour less clearly visible in an image, for example. R may be fixed at the value 0.75, for example. As represented in flowchart form in FIG. 9, the described checking of the center pixel and the trapping color and the modification of the center pixel proceed identically for the other color separation values. After the corresponding processing of all color separation values, the window is moved into its next position, and all the above described steps are repeated.

Figures 10A, 10B, 10C:
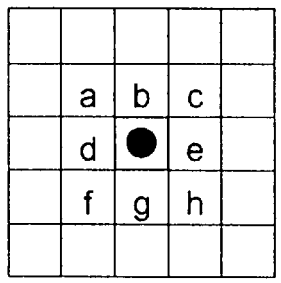
FIG. 10 an exemplary embodiment of the invention.

FIG. 10 represents another example of the inventive method. FIG. 10A represents the window that is used, with the neighboring pixels that are premarked for selection identified as (a, b, c, d, e, f, g, h) therein. For the sake of better survey ability, it is assumed in the example that the color values are formed only from the color separations cyan and magenta. FIG. 10B represents the color separation values for cyan and magenta inside the window. Thus, given the values CZ=0, MZ=100 for the center pixel, the dark value DZ for the center pixel equals 400, and the darkest color separation SZ is magenta. The table in FIG. 10C includes the dark values DN and the darkest color separations SN of the neighbor pixels (a, b, c, d, e, f, g, h), as well as which neighbor pixels are selected for further processing according to the criterion of the flowchart in FIG. 8. From the selected neighbor pixels, the trapping color CT=65 and MT=100 are calculated as an average value. According to the criterion of the flowchart in FIG. 9, the modified color for the center pixel is ultimately calculated using the equation CZ_neu=65×R, MZ_neu=100. Only the cyan value is modified, whereas the magenta value remains unchanged, because MZ is not less than MT/2.

We claim:

1. A method of generating trapping contours in a page provided in the form of digital image data, for ameliorating disturbing effects of misregistrations in a printing machine, the method which comprises:

moving a window over the image data of the page pixel-by-pixel, wherein the window contains a center pixel and neighbor pixels premarked for further processing;

determining respective dark values for the center pixel and for the premarked neighbor pixels from color separation proportions;

determining a darkest color separation for the center pixel and for the premarked neighbor pixels;

comparing the dark values and the darkest color separations of the center pixel and of the premarked neighbor pixels for selecting particular pixels from the premarked neighbor pixels;

calculating a trapping color from the selected particular pixels;

comparing the color separation proportions of the center pixel with the corresponding color separation proportions of the trapping color and correspondingly modifying the color separation proportion of the center pixel.

2. The method according to claim 1, wherein the step of determining the respective dark values comprises weighting the color separation proportions according to a subjectively perceived brightness thereof.

3. The method according to claim 1, wherein the step of determining the darkest color separation comprises weighting the color separation proportions according to a subjectively perceived brightness thereof.

4. The method according to claim 1, which comprises selecting only those pixels of the premarked neighbor pixels whose dark value is less than that the dark value of the center pixel and whose darkest color separation is not equal to the darkest color separation of the center pixel.

5. The method according to claim 1, which comprises calculating the color separation proportions of the trapping colors as average values of the corresponding color separation proportions of the selected pixels.

6. The method according to claim 1, which comprises modifying a color separation proportion of the center pixel only if the color separation proportion of the center pixel is less than a first threshold value, defined as a function of a corresponding color separation proportion of the trapping colors, and if the first threshold value exceeds a second threshold value.

7. The method according to claim 1, which comprises, if the black separation value of the center pixel exceeds a threshold value, replacing other color separation values of the center pixel by the corresponding color separation values of the trapping colors.

8. The method according to claim 1, wherein the step of modifying the color separation proportions of the center pixel comprises replacing the color separation proportions with corresponding color separation proportions of the trapping colors, which have been reduced by a reduction factor.

* * * * *